Patented June 26, 1951

2,558,139

UNITED STATES PATENT OFFICE 2,558,139

DENTAL MATERIAL AND METHOD

Frances E. Knock, Oak Park, Ill., and John F. Glenn, Milford, Del., assignors to The L. D. Caulk Company, Milford, Del., a corporation of Delaware No Drawing. Application August 26, 1947, Serial No. 770,756

14 Claims. (Cl. 260—45.5)

This invention relates to a dental material and method, and more particularly, to an improved material and method for dental restorations including the production of materials which quickly harden in the mouth and are useful for direct filling materials, denture reliners and cements for inlays and jacket crowns and other dental appliances, as well as for the fabrication of appliances made outside the mouth, such as dentures, both temporary and permanent, individual impression trays, denture repairs, dental splints, orthodontia space retainers, bite opening appliances, study models, jacket crowns, base plates, etc.

The dental materials of the present invention, when admixed for use, range from a viscous liquid in the case of dental adhesives to a thick dough for direct filling materials. All of the materials have a liquid polymerizable monomer content, at least one polymerization catalyst and at least one polymerization promoter and also have the common property of quickly hardening to a tough non-porous material by polymerization of the liquid monomer content at low temperatures, i. e., ordinary room temperatures or temperatures no higher than mouth temperatures. Most of the compositions of the present invention also desirably include a finely divided polymer or mixture of polymers which may be at least partly soluble in the monomer employed, although in some instances all or a portion of the polymer content may be substantially insoluble in the monomer so as to function as an inert filler and in certain cases other finely divided inert fillers, such as ground glass, talc, silica, insoluble inorganic salts, solid organic plasticizers, pigments, etc., may be substituted in whole or in part for the polymer. In any event, the essential material in the final product is a polymerized material produced by polymerizing a monomer or mixture of monomers in situ in the presence of a suitable polymerization catalyst and a polymerization promotor. Volatile solvents for any of the materials are preferably omitted.

Dental material for denture reliners, direct filling materials and dental adhesives containing polymerized material have heretofore frequently contained substantial amounts of volatile organic solvents for the polymer. Hardening of such dental material in situ in the patient's mouth has been by reason of evaporation of the volatile solvent or leaching of the solvent from the dental material by the mouth fluids or both. The removal of the solvent from the residual solid polymer has caused shrinkage of this material so that it has been difficult or impossible to secure adequate adhesion to the teeth or denture or to accurately produce the desired shapes in the case of fillings or denture reliners. Also, the removal of the solvent has caused the residual solid polymer to develop pronounced porosity which not only detracts from the appearance of the material but results in a rapid collection of foreign organic material in the pores with consequent fouling of the denture or other restoration. Furthermore, in the case of denture reliners, penetration of the volatile solvent into the material of the denture base causes definite weakening of the base.

When fabricating dentures and other dental appliances made outside the mouth the hardening of the denture material has been carried out in molds constructed in accordance with known procedures. The most successful of the previously employed compositions have, however, been slow to harden and have required at least several hours' treatment at elevated temperatures to convert the molded material to a hard structurally strong material.

In contrast, the dental materials of the present invention harden by polymerization of a monomer or mixture of monomers into a hard, non-porous, structurally strong material within a short time either in the mouth when subjected to mouth temperatures or for appliances made outside the mouth, when subjected to ordinary room temperatures. In the latter case, moderately elevated temperatures may be employed but are usually not necessary. The rapid hardening is produced by employing a polymerization promoter in addition to a polymerization catalyst. The catalysts employed are either peroxide or persulfate catalysts, or various mixtures thereof. The monomer content can be substantially any monomer or mixture of monomers which have their polymerization reaction catalyzed by such catalysts and the promoter may be any one of a large number of nitrogen containing compounds as hereinafter more specifically discussed.

It is therefore an object of the invention to provide an improved dental material and process for fabricating various dental restorations either in the mouth or exterior thereof.

Another object of the invention is to provide an improved dental material which may range from a viscous liquid to a stiff dough and which hardens at room or mouth temperatures without substantial shrinkage into a non-porous structurally strong material within a short time.

Another object of the invention is to provide a new dental material and process in which a polymerization promoter in addition to a polymerization is employed to produce rapid polymerization and hardening of a monomer or monomer mixture forming part of the dental material.

Other objects and advantages of the invention will appear in the following description of preferred embodiments thereof.

The monomer most frequently employed in the production of dental restorations has been methyl methacrylate because of its superior optical properties, dimensional stability, chemical and water resistance and resistance to aging of its polymers and copolymers and ready availability. The invention will be discussed largely in connection with the polymerization of methyl methacrylate but as will appear below, the present invention renders various other monomers available for dental purposes by eliminating factors which have heretofore restricted their use, for example, their slow polymerization rate. A large number of nitrogen containing compounds promote polymerization of methyl methacrylate, as well as many other monomers containing a vinyl or vinylidene group and also promote copolymerization of various mixtures of such monomers, when employed in conjunction with a peroxide or a persulfate catalyst. In general, nitrogen containing promoters are not polymerization catalysts when used by themselves or in a mixture with each other and may even inhibit polymerization reactions in the absence of a peroxide or persulfate catalyst. Certain of them may have some catalytic action when employed in the absence of a peroxide or persulfate catalyst, but this effect is usually below that of the catalytic effect of peroxide or persulfate catalysts. When employed in conjunction with a peroxide or persulfate catalyst, however, the promoters of the present invention markedly accelerate or promote polymerization or copolymerization of methyl methacrylate and other monomers or mixtures of monomers of the same general type. That is to say, the reaction is very much faster than is the case when the peroxide or persulfate are employed in the absence of a promoter.

The most effective nitrogen-containing compounds thus far found which promote polymerization or copolymerization reactions in the presence of a peroxide or persulfate catalyst are:

Meta tolyl diethanolamine

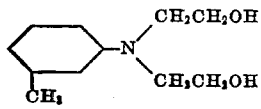

Phenyl diethanolamine

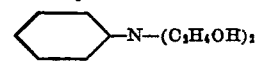

β-Hydroxyethyl ethyl aniline

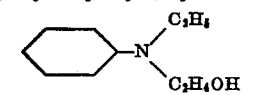

β-Hydroxyethyl methyl aniline

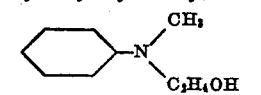

p-Diethyl aminodiphenyl

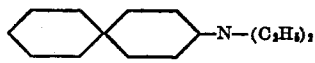

p-Diethylamino chloro benzene

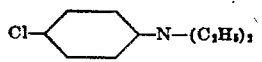

m-Dimethyl sulfonamido phenyl diethanolamine

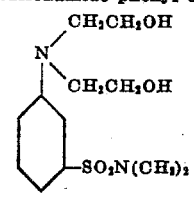

N-phenyl glycine

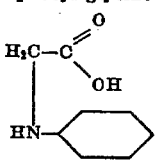

Tri-isopropanolamine

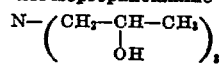

N-butyl-maleinimide

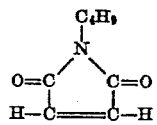

Phthalimide

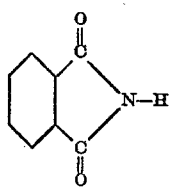

Of the above compounds, the first seven are approximately equally active as promoters and markedly decrease the time required for polymerization at a given temperature in the presence of a suitable catalyst. A methyl methacrylate monomer, for example, will polymerize in a small fraction of the time heretofore required when a small amount of such promoters is present during the polymerization reaction in addition to a peroxide catalyst. Such promoters are particularly useful at relatively low temperatures, for example at 20° to 40° C. The promotion effect of N-phenyl glycine is, in general, not as great as the first seven compounds listed and the tri-isopropanolamine, N-butyl maleinimide and phthalimide produce a somewhat slower reaction than the N-phenyl glycine. These compounds are, however, useful even at the lower temperatures referred to and are also useful at higher temperatures.

While the above listed compounds are the most active polymerization promoters tested, there are a large number of nitrogen-containing compounds which do have a substantial promotion activity. Examples of such nitrogen-containing compounds which effect a somewhat slower reaction when employed as polymerization promoters along with a peroxide or persulfate catalyst, but which are useful for many purposes, are:

Creatinine, diisobutyl nitrosamine, chlorosaccharin, barbituric acid, N-aceto saccharin, thiobarbituric acid, acetanalide, N,N'-dichlorodimethyl hydantoin, N-chloroacetamide, melamine, mono-tertiary butyl urea, benzyl pseudothiourea, N-acetodimethyl hydantoin, dimethyl hydantoin, phenyl methyl pyrazolone, isoamyl carbamate, N-chlorophthalimide, saccharin, N-beta hydroxyethylphthalimide, 1-amino-benzothiazole-5-sulfonamide and tetrazine.

The nitrogen-containing compounds including those mentioned above which, in general, increase the rate of polymerization of monomers or mixtures of monomers of the type contemplated in this invention in the presence of a peroxide or a persulfate catalyst are classified below.

In the general structural formulas in this classification, radicals R, R', R" and R''' may, in general, be hydrogen, alkyl, alkenyl, alkynyl, cycloalkyl, aralkyl or aryl groups both simple and condensed or any of the groups in the above list substituted with any of the radicals represented by R, $NO_2$, $SO_2NR_2$, $SO_2OR$, $SO_2R$, $NR_2$,

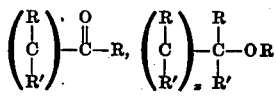

OCOR, OR, COOR, halogen or heterocyclic rings. In such general formulas, R, R', R" and R''' may be the same or different and even when more than one radical is represented by R or R', etc., such radicals may be the same or different.

Also, Ar represents a simple or condensed aromatic ring substituted or unsubstituted, including heterocyclic rings. The radical M is employed to represent O, S, NR or $NR_2$. The radical X is employed to represent either R, COR,

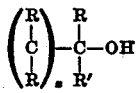

or halogen. The radical Z and Z' may represent either R, or halogen. When more than one M, X or Z or their primes appears in a given formula, each may be the same or different. When any limitations upon or extension of the meaning of a particular one of the radicals listed appears as to a given general formula, it will be stated in each of the classifications, but otherwise the various radicals have the significance stated above. In all cases $x$ may have the value 0 to 12.

CLASS 1

Alkylol amines of the following types:

(a), (b), (c), (d)

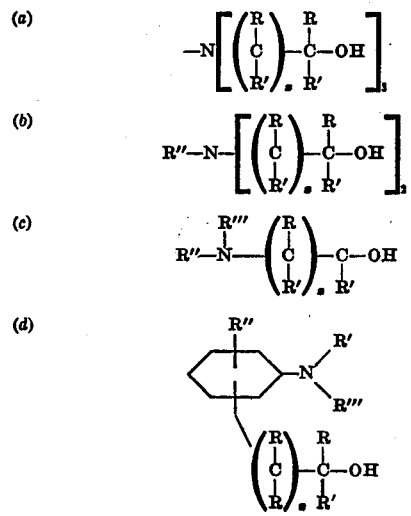

Examples of promoters within this class are:
(a) Tri-isopropanolamine
(b) Phenyl diethanolamine
(a) N,N-diethanol, 1-amino, 2-hydroxy butane 3
(c) β-Hhydroxyethyl methyl aniline
(c) β-Hydroxyethyl ethyl aniline
(b) N-butenol-N-ethanol aniline
(b) m-Tolyl diethanolamine
(b) m-Dimethyl sulfonamido phenyl diethanolamine

CLASS 2

Tertiary amines of the following type:

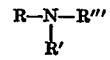

Examples of promoters falling within this group are:

Triphenylamine
p-Diethylaminodiphenyl
p-Diethylamino chloro benzene
Methylbenzylaniline
Ethylbenzylaniline
N-methyl-indole-3-butyric acid

CLASS 3

Nitroso compounds of the type:

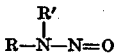

An example of a promoter falling within this class is: Dibutylnitrosamine.

CLASS 4

Amides of the following types:

(a)

(b)

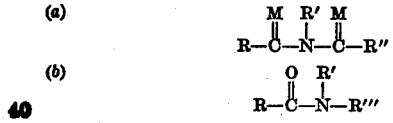

In (a) of this class, R or R" may also be $NH_2$ and in (b) R''' may also be a halogen or Ar.

Examples of amides falling within this class are:

(a) Biuret
(b) N,N-diphenylacetamide
(b) N-chloroacetamide
(b) Acetanilide
(b) Chloroacetanilide
(b) N-aceto diphenylamine

CLASS 5

Imides of the following types:

(a)

(b)

(c)

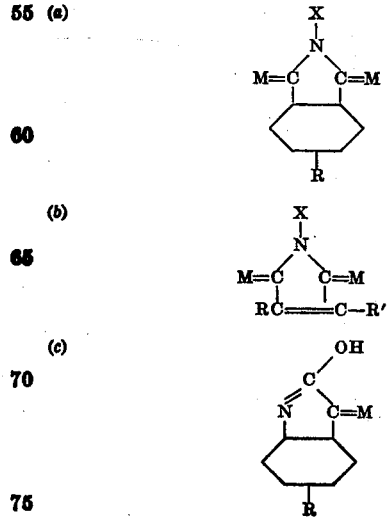

In this class X can also represent hydrogen and in (a) and (c) of this class, the aromatic ring can represent either simple or condensed aromatic rings, substituted or unsubstituted, including heterocyclic rings, i. e., the aromatic ring can be Ar as defined above.

Examples of promoters falling in this class are:

(c) Isatin
(b) N-butyl maleinimide
(a) Phthalimide
(a) N-aceto phthalimide
(a) N-hydroxyethyl phthalimide
(a) N-phenyl phthalimide
(a) N-chlorophthalimide

CLASS 6

Sulfonimides of the following type:

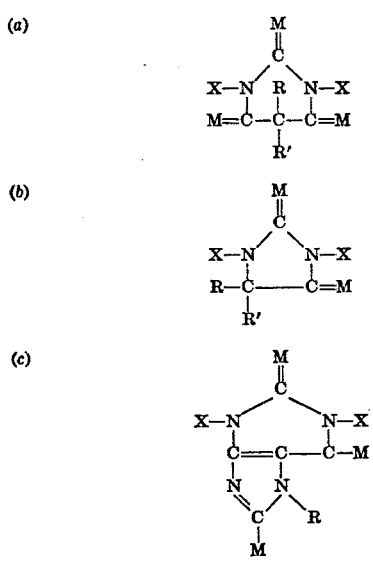

Examples of promoters in this class are:

Saccharin
N-chlorosaccharin

CLASS 7

Ureas of the following type:

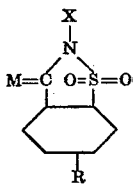

Examples of promoters in this class are:

Tertiary amylurea
Mono-tertiary butylurea

CLASS 8

Cyclic ureas of the following types:

(a)

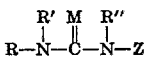

(b)

(c)

The above formulas are to be regarded as typical only since double bonds may be present in various positions in the rings of both (a) and (b); either a greater or lesser number of double bonds may be present in (c), and also the double bonds may occupy alternative positions with consequent alternate positions or loss or gain of substituent radicals as illustrated by the compounds listed below.

Examples of promoters in this class are:

(a) Barbituric acid
(a) Nitrobarbituric acid
(b) Dimethyl hydantoin
(b) N,N'-dichlorodimethylhydantoin
(b) Creatinine
(a) Thiobarbituric acid
(b) N-aceto dimethyl hydantoin
(a) Uracil
(a) Uramil
(c) Theobromine
(c) Caffeine
(c) Hypoxanthine
(c) Xanthine
(c) Guanine
(c) Adenine
(a) Thio uracil
(c) Uric acid

CLASS 9

Pseudo thioureas of the following type:

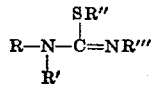

An example of a promoter in this class is:
Benzyl pseudothiourea.

CLASS 10

Carbamates of the following types:

(a) $X-N-COOR$ with $R'$
(b) $X-N(COOR)_2$
(c) $N(COOR)_3$

Examples of promoters in this class are:

(a) Isoamyl carbamate
(a) Ethyl-N-phenylcarbamate
(b) N-N dicarbethoxy aniline

CLASS 11

Sulfonamides of the follow type:

In this class Ar can also represent a benzothiazole ring. Examples of promoters in this class are:

Chloramine T
Dichloramine T
p-Cymene-2-sulfonamide
1-aminobenzthiazole-5-sulfonamide

CLASS 12

Heterocyclic compounds containing nitrogen in the heterocyclic ring, for example, pyrazolones and piperazines, thiazines, tetrazines, thiazoles, arylene thiazoles and alkylene thiazoles.

Typical general formulas are:

(a)

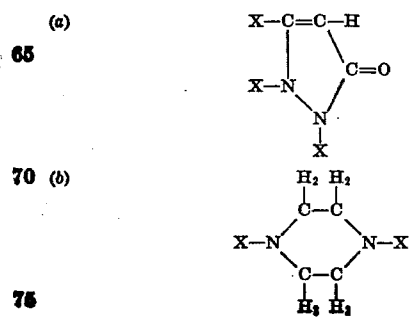

(b)

(c)

(d)

(e)

(f)

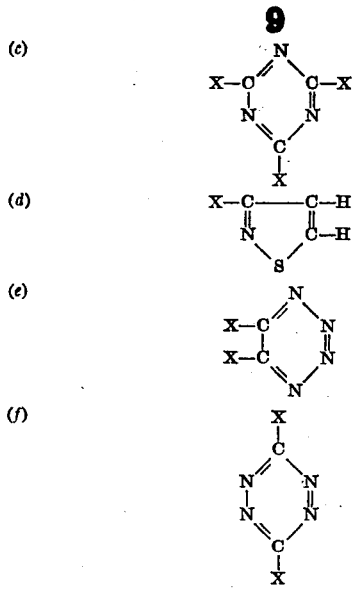

The above formulas in this class are also to be regarded as typical only since the degree of unsaturation may vary and the double bonds may occupy various positions other than those shown.

In this class X may also be

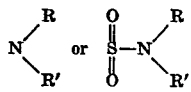

Examples of compounds in this class are:

(f) Tetrazine
(a) Antipyrine
(c) Melamine
(a) Phenyl methyl pyrazolone
(b) N,N diphenyl piperazine

CLASS 13

Trialkylol amino compounds of the following type:

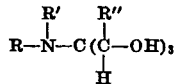

An example of promoters of this type is: Trimethylolaminomethane.

CLASS 14

Amino acids of the following type:

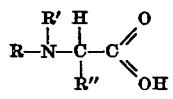

where R, R' and R" may be additionally heterocyclic groups substituted with R, OR or $NR_2$.

Examples of promoters of this class are:

N phenyl glycine
Tryptophane
d-l-Alpha amino-butyric acid
d-Alpha amino-n-butyric acid
l-Alpha amino-n-butyric acid.

CLASS 15

Nitro compounds of the type:

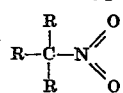

Examples of promoters in this class are:
Trimethylol nitro methane
Dimethylol nitro methane
2-methylol-2-nitro propane
2-nitro propane In general, mixtures of the above promoters also have a promotion effect upon catalyzed polymerization or copolymerization reactions of the type contemplated by the present invention. Mixtures of promoters may, however, produce either a greater or lesser acceleration of such reactions than would be expected from the accelerations produced when each of the promoters is employed as the sole promoter.

For example, the promoter action of tri-isopropanolamine is markedly enhanced by the presence of a small amount, such as $\tfrac{1}{10}$ of the tri-isopropanolamine, of either phenyl diethanolamine, N-butyl maleinimide, trimethylol aminomethane or tetrazine or various combinations thereof. In addition, the presence of tetrazine produced a considerably harder surface than is obtained with tri-isopropanolamine alone. The promoter action of tri-isopropanolamine is, however, markedly inhibited by the presence of a small amount of dichlorodimethyl hydantoin, chlorosaccharin or barbituric acid. Consequently it is possible to control the rate of reaction to produce any desired reaction rate by employing various mixtures of a relatively few nitrogen-containing promoters from the classes above given.

As stated above, polymerization or copolymerization reactions of a large number of monomers containing a vinyl group and catalyzed by peroxide or persulfate catalysts may be markedly accelerated by carrying on the reaction in the presence of any of the above promoters and in the presence of various mixtures of the above promoters. The promoters are particularly applicable to such reactions involving polymers or copolymers of methyl methacrylate, other acrylic monomers and dichlorostyrene.

Examples of other monomers whose polymerization or copolymerization reactions are promoted by the above promoters, when catalyzed by peroxide or persulfate catalysts, are as follows:

(1) All other acrylates or methacrylates such as ethyl acrylate, butyl acrylate, hexyl acrylate, etc.; ethyl methacrylate, butyl methacrylate, etc.; acrylonitrile; methyl alpha chloro acrylate, ethyl alpha chloro acrylate, butyl alpha chloro acrylate, etc.

(2) Vinylidene chloride
(3) Methyl vinyl ketone
(4) Allyl esters such as diallylmaleate
(5) Methallyl esters such as dimethallylmaleate
(6) N-vinyl carbazole
(7) Maleic anhydrides
(8) Maleinimides
(9) Styrene and styrene substituted by the groups represented by R
(10) Vinyl esters In general, the monomers contemplated by the present invention are of the following types:

(a)

(b)

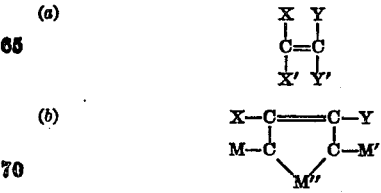

In this general formula, X, X', Y and Y' may be the same or different and may be hydrogen, alkyl, halogen, alkenyl, alkynyl, cyclo-alkyl, aralkyl, aryl (either simple or condensed), cyano, carboxyl, acyl, acyloxy, carbalkoxy, carbonyl, carbazolyl phthalimidyl, or OR, $SO_2OR$, $SO_2R$, SSR, SR or heterocyclic rings containing O, N or S such as furyl, pyridyl, etc., or may be any of the above groups substituted with the radicals represented by R, X, $NR_2$ or OR. Also M and M' may be the same or different and may be NX, C or S. Also, in general, either polymerization or copolymerization reactions involving mixtures of the above monomers are promoted.

It is also possible to produce a combined monomer and promoter. Thus, certain of the promoters may be provided with unsaturated groups enabling them to polymerize or to copolymerize with other monomers. Examples of such monomers having promoting groups are p-diethanolaminophenyl acrylate and p-diethanolamino-phenyl methacrylate. These are in effect monomers with "built-in" promoters.

In making dental cements, it is possible to merely mix the catalyst and promoter with a liquid monomer or monomer mixture or to merely mix the catalyst with a combined monomer and promoter as discussed above. The cement is then applied and held at the desired temperature until hardening takes place. Cements as well as doughs for molding or for denture reliners or direct filling material preferably contain a polymer which is preferably soluble in the monomer content for cements but this invention is not limited to soluble polymers. The various ingredients may be mixed in any desired order, but where the promoter alone acts as an inhibitor of polymerization of the monomer, or at least does not have any appreciable catalyst action itself, it is preferred to make up two initial mixtures, one a liquid mixture containing the promoter admixed with the monomer and the other a powdered mixture containing the solid material admixed with the catalyst. These two mixtures may be separately packaged for sale, the final mixture being made by the user. It will be apparent that polymerization may be carried on either with monomers or mixtures of monomers, or that finely divided solid material including material which is either soluble, partly soluble or insoluble in the monomer content may be added in any proportions up to that which forms a stiff dough, for example, up to approximately 90% solid material.

With certain of the monomers and monomer mixtures above discussed, relatively rapid polymerization rates may be obtained even at ordinary temperatures such as 20° to 25° C. in the presence of a catalyst and promoter and in most cases, reaction rates are substantially accelerated at temperatures of 38° to 40° C. In general, the reaction rate increases with temperature and the temperature may be increased to any temperature below that at which boiling of monomer takes place or the reaction becomes too rapid. Thus, temperatures between approximately 20° C. and 100° C., or higher, may be employed, depending upon the nature of the monomer or monomer mixture and the amount and nature of the promoter.

Examples of catalysts which can be employed in the polymerization or copolymerization operations discussed above are:

1. Peroxide catalysts
    a. Benzoyl peroxide
    b. Lauroyl peroxide
    c. Ditertiary butyl diperphthalate
    d. Tertiary butyl hydroperoxide 2. Persulfate catalysts
    a. Ammonium persulfate
    b. Potassium persulfate
    c. Magnesium persulfate Other peroxide and persulfate catalysts can, however, be employed as well as various mixtures of catalysts, including mixtures of persulfate and peroxide catalysts.

The amount of catalyst and promoter necessary for a given polymerization or copolymerization reaction will vary with the monomer or mixture of monomers employed, as well as the promoters or mixture of promoters used, and will depend to some extent upon the catalyst. In general, approximately 1% of each of the catalyst and promoter, based upon the weight of the monomer or monomer mixture, is sufficient, but in many cases, the acceleration of the reaction is enhanced by larger amounts of either or both the catalyst and promoter, and on the other hand, lesser amounts of either or both of the catalyst and promoter are many times effective. Catalytic polymerizations or copolymerizations of the type contemplated by the present invention are addition reactions and are usually considered to be roughly divided into three states known as (1) initiation, (2) propagation and (3) cessation. In some cases a very small amount of catalyst and promoter is sufficient to initiate the reaction and propagation to cessation follows without apparent need for further catalyst or promoter. In other cases, either the catalyst or promoter or both appear to be absorbed by or to react with the monomer during the reaction so that a considerable amount of catalyst or promoter is necessary to sustain the reaction to substantial completion. Thus, amounts of catalysts varying between approximately 0.1% to 10% constitute the practical range and the same is true of the promoter. In most cases, the amounts of both promoter and catalyst will be between 0.5 and 5%. These ranges for the promoter apply when the promoter itself is not a polymerizable monomer. If a monomer contains a promoting group as discussed above so that the promoter is itself a monomer, it may comprise the entire monomer content being polymerized or may form any desired proportion of a monomer mixture. Additional promoters may be employed with such combined monomers and promoters either in monomer mixtures or where the combined monomer and promoter forms 100% of the monomer.

Monomers as usually supplied contain a polymerization inhibitor such as hydroquinone or ditertiary butyl catechol. Such inhibitors can be removed by distillation or by treatment of the monomer with an adsorbent, such as alumina or by washing operations, all of which are expensive and time-consuming. These inhibitors are ordinarily removed when a peroxide or persulfate catalyst is employed in the absence of a promoter. When promoters in accordance with the present invention are employed along with the catalyst, the presence of the inhibitors contained in commercial monomers has substantially no effect upon the polymerization reaction.

*Example 1*

As a specific example the following mixture may form the powdered component of either a direct filling material or a cement:

|  | Per cent |
|---|---|
| Polymer (granular methyl methacrylate) | 75 |
| Filler (aluminum silicate and pigments) | 23 |
| Catalyst (benzoyl peroxide) | 2 |

The proportions are by weight and the various ingredients are intimately admixed and may be packaged for sale as a stable mixture. The pigment forming part of the filler will usually form a very small proportion of the product, for example, 0.1% to 0.5%, and will vary in amount and nature depending upon the intended use of the composition.

*Example 2*

As another specific example, a liquid component for direct filling material may be as follows:

|  | Per cent |
|---|---|
| Monomer (methyl methacrylate) | 99 |
| Promoter (phenyl diethanolamine) | 1 |

In this example, as well as the other examples, the monomer will ordinarily contain a small amount of a polymerization inhibitor. Such inhibitor renders the liquid mixture stable so that it can be packaged and sold but the inhibitor has substantially no effect upon the polymerization rate when both a catalyst and promoter are present.

*Example 3*

As a specific example of a direct filling material, 2 parts by weight of the powdered material of Example 1 were admixed with 1 part by weight of the liquid material of Example 2. This produced a material having the consistency of dough which can be pressed into a cavity of a tooth as a direct filling material soon after mixing. This material will polymerize to a hard, structurally strong material adhering to the tooth surface within a period of approximately 6 minutes from the beginning of mixing of the liquid and powdered materials when subjected to mouth temperatures. The resulting filling can be ground and polished soon after hardening.

*Example 4*

The following is a specific example of a liquid material for making a dental cement for use in the mouth:

|  | Per cent |
|---|---|
| Monomer (methyl methacrylate) | 80 |
| Polymer (granular methyl methacrylate) | 19 |
| Promoter (phenyl diethanol amine) | 1 |

*Example 5*

A final mixture for a dental cement for employment in the mouth was produced by mixing 1½ parts by weight of the powdered material of Example 1 with 1 part by weight of the liquid material of Example 4 to produce a viscous liquid containing suspended solids. This material may be employed for cementing such dental appliances as jacket crowns, inlays, bridges, orthodontia space retainers and bite opening appliances to teeth or to other dental appliances in the mouth and hardens to a structurally strong cement by polymerization in approximately 6 minutes after the initial mixing when subjected to mouth temperatures. In general, both surfaces to be cemented together are coated with a thin layer of the mixture of powdered and liquid components soon after mixing and the two coated surfaces then pressed together and allowed to remain in contact until the cement hardens. After hardening, any excess cement can be removed by techniques known to the art.

*Example 6*

A powdered material suitable for making denture reliners, dentures, both temporary and permanent, and individual impression trays, may be the following:

|  | Per cent |
|---|---|
| Polymer (granular methyl methacrylate) | 96.5 |
| Pigments and opacifier | 0.5 |
| Catalyst (benzoyl peroxide) | 3.0 |

The pigment in the above may be iron oxide or other mineral pigment and the opacifier may be titanium dioxide, barium sulfate, etc. The relative proportions of pigment and opacifier will depend upon the tint and opacity required for the particular dental appliances, and in some cases may be omitted, particularly in the production of individual impression trays.

*Example 7*

A liquid material which may be employed with the powdered material of Example 6 may be the following:

|  | Per cent |
|---|---|
| Monomer (methyl methacrylate) | 99 |
| Promoter (p-diethylaminochlorobenzene) | 1 |

*Example 8*

For preparing a final mixture of the materials of Examples 6 and 7, approximately 1.8 parts by weight of the powdered material of Example 6 was admixed with 1 part by weight of the liquid of Example 7. This material will polymerize at room temperature in approximately 15 minutes after the initial mixing operation. It will polymerize somewhat more rapidly, for example in approximately 10 minutes when employed for making a denture reliner at mouth temperature.

*Example 9*

Another powdered material for use in making denture reliners, dentures, both temporary and permanent, and individual impression trays, may have the following composition:

|  | Per cent |
|---|---|
| Polymer (granular methyl methacrylate) | 97.9 |
| Pigment and opacifier | 0.1 |
| Catalyst (lauroyl peroxide) | 2.0 |

*Example 10*

A liquid component for admixture with the powder of Example 9 may have the following composition:

|  | Per cent |
|---|---|
| Monomer (methyl methacrylate) | 99.0 |
| Promoter: | |
| Phenyl diethanolamine | 0.50 |
| p-Diethylamino, diphenyl | 0.25 |
| p-Diethylaminochlorobenzene | 0.25 |

*Example 11*

To produce a final product of dough consistency, approximately 1.8 parts by weight of the powdered material of Example 9 may be admixed with 1 part by weight of the liquid material of Example 10. This material will polymerize to a hard, structurally strong material in approximately 20 minutes after the initial mixing at room temperature and in approximately 15 minutes at mouth temperature.

It should be apparent that the liquid component of Example 7 can also be employed with the powdered component of Example 9 to produce a material of dough-like consistency which will polymerize in approximately 20 minutes at room temperature, and the liquid material of Example 10 may be employed with the powdered material of Example 6 to produce a material which will harden in approximately 15 minutes at room temperature.

In making denture reliners, the surface of the denture which is intended to contact the mouth tissue is coated with a layer of plastic material such as that made in accordance with Examples 8 and 11 and the denture, with or without the use of a protective film on the relined portion, is then placed in position in the mouth. The plastic material conforms to the shape of the mouth tissues and hardens so as to produce an accurate fit. The relined denture, after removal of any excess material, may be continued to be worn by the patient without further treatment.

For making dentures, both temporary and permanent, it is common to employ commercially available impression trays, generally conforming to the contours of the mouth, and filled with an impression material to secure an impression of the mouth tissues. In many cases such trays are not satisfactory for the production of good impressions. In such cases, it has been the practice to first take what is known as a snap impression by using one of the ordinary impression trays filled with an impression compound. A plaster cast is made from this impression and a base plate, which is ordinarily made of a shellac composition which softens when warmed, is formed while warm over the plaster cast and then allowed to cool. Such a formed base plate more accurately conforms to the mouth contours of a particular patient than the impression trays above referred to and is then filled with impression material and employed as a custom built impression tray for obtaining a final impression.

Instead of employing a heat deformable base plate as above described, a material having the consistency of dough and produced in accordance with Examples 8 and 11 may be rolled or otherwise formed into a sheet while still plastic and then formed over the plaster cast above referred to and allowed to harden at room temperature. This produces a custom built impression tray in a quicker and more economical manner. Such a tray can easily be provided with a suitable handle formed of the plastic material during application to the cast and has the advantage that it can be repeatedly used and sterilized by boiling between uses without causing deformation of the tray. A material prepared as in Example 11 can also be rolled out into a film of appropriate thickness, cut to appropriate size, and with or without the application of a protective film, used to form directly over the mouth tissues a custom built impression tray.

A final impression obtained by using the tray just described, or in any other suitable manner, can be employed in the fabrication of a denture. This is usually done by first making a plaster cast of the final impression, and then forming a wax model of the denture upon such plaster cast and inserting the teeth in the wax. The entire structure is then invested in plaster in a dental flask and after hardening of the plaster, the wax is melted out by hot water. A two-part mold for the denture is thus produced. This mold is then employed to produce the denture by packing the cavity in the mold with a plastic polymerizable material and curing such material. Previously available polymerizable materials have required several hours heating at temperatures between 70° and 100° C. By employing the polymerizable material of Example 8 and 11, curing can be accomplished in approximately 20 minutes at room temperature.

Dentures may, however, be made directly on the plaster cast without the employment of wax, or production of a mold or heating to polymerize. A sheet of plastic material such as that produced in accordance with Examples 8 and 11 can easily be formed by hand over the plaster cast into the shape of the denture and the teeth directly inserted into the plastic material in the proper places, by an individual skilled in the art. The plastic material hardens by polymerization at room temperature in approximately 20 minutes and after trimming and polishing the denture is then ready for immediate wearing.

Frequently it is necessary to repair a denture or a partial denture by mending a fracture which has occurred or replacing a portion of the denture or tooth that has been broken from the denture. Prior to this invention it has been necessary to make a mold by investing the denture or partial denture in a flask and then add new plastic material and cure for several hours at elevated temperatures. By employing the materials of Examples 8 and 11 it is possible to make such repairs within a few minutes time by merely applying such material to the portion of the denture requiring repair, inserting any teeth requiring replacement into the dough and allowing this dough to polymerize at room temperature which will be accomplished within a period of approximately 20 minutes from the mixing of the dough.

Although a method of fabricating individual dental trays has been described above, some dentists prefer to employ base plates for obtaining final impressions. An improved base plate which can be formed after warming in any suitable manner, for example over a flame, can be produced in accordance with the present invention by incorporating a relatively large amount of plasticizers into the polymerizable material and then forming the base plate and allowing polymerization to take place. Suitable plasticizers for this purpose are dibutyl phthalate, triphenyl phosphate, tricresyl phosphate, toluene sulfonamides such as the ortho and para N ethyl toluene sulfonamides, orthocresyl p-toluene sulfonate, ethyl phthalyl ethyl glycollate and low molecular weight styrene polymers. Other known or suitable plasticizers for polymers of the type discussed at length above can also be employed.

*Example 12*

A powdered material suitable for producing a base plate for dental purposes may be prepared as follows:

| | Per cent |
|---|---|
| Polymer (granular methyl methacrylate) | 97 |
| Catalyst (benzoyl peroxide) | 3 |

*Example 13*

A liquid material for base plates may be as follows:

| | Per cent |
|---|---|
| Monomer (methyl methacrylate) | 49.5 |
| Promoter (phenyl diethanolamine) | 0.5 |
| Plasticizer (triphenyl phosphate) | 50.0 |

*Example 14*

A final mixture for making base plates may be prepared by admixing 2 parts by weight of the powdered material of Example 12 with 1 part by weight of the liquid material of Example 13.

This material may be rolled or otherwise formed into a sheet of the desired shape and hardens by polymerization in approximately 20 minutes at room temperature.

Base plates as prepared in accordance with Example 14 may be manufactured in various sizes and shapes and sold to dentists or the powdered and liquid components may be separately packaged and sold so that the dentist or technician can make individual base plates of the desired size and shape. Such base plates may be warmed and formed to the desired shape in the same manner as known types of base plates.

Materials made in accordance with this invention can also be used directly as impression compounds. One such type of impression compound will harden to a rigid mouth impression which can be trimmed down and can serve as a base for combination into a permanent denture by addition of a ridge of plastic material prepared in accordance with this invention, the placing of teeth in proper position in said material, and their fixation by polymerization of the added material. After subsequent trimming and polishing, the denture can be worn by the patient.

The second type of such impression material will remain elastic. The advantage of such materials over the usual impression compounds lies in their dimensional stability owing to no subsequent loss of volatile or soluble components. In addition, it is possible to prepare an impression material which will remain elastic long enough to secure an accurate impression but which, on removal from the mouth, will become hard and will be capable of being used in accordance with the technique described above for preparing dentures directly, as a base plate, or impression tray, or for the preparation of orthodontia appliances, etc.

In general the powdered component of the present invention prepared for admixture with a liquid component to produce a dental material will contain the catalyst for the polymerization reaction and will contain any finely divided inorganic or other inert filler and will usually contain a finely divided polymer. The catalyst is the essential material and may therefore range between approximately 0.1% and 100% of the powdered component. The amount of inert inorganic filler including pigments and opacifiers may range from 0 to 99.9% and the same is true of finely divided polymers. Any plasticizer employed may likewise form a part of the powdered material if the plasticizer is a solid and the amount of plasticizer may also range from 0 to 99.9%.

The polymers may be any of the polymers resulting from the monomers or mixture of monomers discussed at length above in which the polymerization has been carried out by conventional heat processes or by employment of the promoters disclosed herein. Such finely divided polymers may be that resulting from grinding a polymer produced by bulk polymerization or the polymer produced by pearl or emulsion or solvent polymerization. Also, the finely divided polymer may be of the condensation type, such a phenol-formaldehyde, urea-formaldehyde or the alkyd or polyester type. Mixtures of various polymers may also be employed. The preferred polymer is, however, methyl methacrylate polymer. The catalyst may be any of those previously mentioned or mixtures thereof, the preferred catalysts being benzoyl peroxide or lauroyl peroxide. The fillers may also be any of the previously mentioned, a preferred filler being aluminum silicate.

The liquid component of the present invention essentially contains the monomer and the promoter. Where the promoter is distinct from the monomer, the promoter may range from approximately 0.1% to 10% and the monomer may range from approximately 10% to 99.9%. Where the promoter forms part of the monomer molecule, as above disclosed, the combined monomer and promoter may range from 10% to 100%. The liquid may also contain a polymer ranging from 0 to approximately 30% and plasticizers either liquid or solid ranging from 0 to approximately 90%. Minor amounts of coloring agents, such as dyes or pigments, may also be incorporated. The monomer may be any of those above discussed or mixtures of such monomers, the preferred monomer being methyl methacrylate. The promoter may also be any of those above disclosed, the preferred promoters being m-tolyl diethanolamine, phenyl diethanolamine, p-diethylaminodiphenyl, p - diethylaminochloro benzene, $\beta$ - hydroxyethyl ethylaniline, m-dimethyl sulfonamido phenyl diethanolamine and N-phenyl glycine.

Although, in general, the final polymerizable material will be a mixture of a powdered material containing the catalyst and a liquid material containing the monomer and promoter, the final mixture may in some cases be a mixture of two liquids. Thus, instead of a powdered material, the first mentioned component may be a liquid plasticizer containing dissolved catalyst or a solid polymer dissolved in a liquid plasticizer. The second component may still be a liquid monomer containing a promoter with or without other ingredients. Such a mixture of liquids will rapidly polymerize into a solid rigid polymer or solid elastomer.

While the preferred embodiments of the invention have been disclosed above, it is understood that the details of the invention may be varied within the scope of the following claims:

We claim:

1. A dental material for making dental restorations which comprises a monomer component containing a tertiary phenyl ethanol amine and a polymerizable liquid monomer comprising methyl methacrylate, and a second component for admixture with said monomer component and containing a polymerization catalyst selected from the group consisting of the peroxide and persulfate catalysts.

2. The material as defined in claim 1 further characterized in that said amine is meta tolyl diethanolamine.

3. The material as defined in claim 1 further characterized in that said second component comprises methyl methacrylate polymer.

4. The material as defined in claim 1 further characterized in that said amine is phenyl diethanolamine.

5. The method of making dental restorations which comprises admixing methyl methacrylate monomer, a tertiary phenyl ethanol amine and a polymerization catalyst selected from the group consisting of the peroxide and persulfate catalysts, immediately fabricating a dental restoration from the resultant mixture, and subjecting said restoration to a polymerization temperature.

6. The method of making dental restorations which comprises admixing a methacrylate monomer component containing a tertiary phenyl ethanol amine with a powdered methacrylate polymer component containing a peroxide catalyst, immediately fabricating a dental restoration from the resultant mixture, and subjecting said restoration to a polymerization temperature.

7. A dental material for making dental restorations which comprises a liquid monomer component containing a tertiary phenyl ethanol amine and a monomeric ester of methacrylic acid, and a solid polymer component for admixture with said monomer component and comprising a peroxide catalyst and a polymer of an ester of methacrylic acid.

8. A dental material for making dental restorations which comprises a liquid monomer component containing a tertiary phenyl diethanol amine and a monomeric ester of methacrylic acid, and a solid polymer component for admixture with said monomer compound and comprising a peroxide catalyst and a polymer of an ester of methacrylic acid.

9. A dental material for making dental restorations which comprises a liquid monomer component containing a tertiary phenyl aykylethanol amine and a monomeric ester of methacrylic acid, and a solid polymer component for admixture with said monomer component and comprising a peroxide catalyst and a polymer of an ester of methacrylic acid.

10. A dental material for making dental restorations which comprises a liquid monomer component containing phenyl diethanolamine and a monomeric ester of methacrylic acid, and a solid polymer component for admixture with said monomer component and comprising a peroxide catalyst and a polymer of an ester of methacrylic acid.

11. A dental material for making dental restorations which comprises a liquid monomer component containing meta tolyl diethanolamine and a monomeric ester of methacrylic acid, and a solid polymer component for admixture with said monomer component and comprising a peroxide catalyst and a polymer of an ester of methacrylic acid.

12. A dental material for making dental restorations which comprises a liquid monomer component containing methyl methacrylate monomer and a tertiary phenyl ethanol amine, and a solid polymer component for admixture with said monomer component and comprising methyl methacrylate polymer and a peroxide catalyst.

13. A dental material for making dental restorations which comprises a liquid monomer component containing methyl methacrylate monomer and phenyl diethanolamine, and a solid polymer component for admixture with said monomer component and comprising methyl methacrylate polymer and a peroxide catalyst.

14. A dental material for making dental restorations which comprises a liquid monomer component containing methyl methacrylate monomer and meta tolyl diethanolamine, and a solid polymer component for admixture with said monomer component and comprising methyl methacrylate polymer and a peroxide catalyst.

FRANCES E. KNOCK.
JOHN F. GLENN.

REFERENCES CITED

The following references are of record in the file of this patent:

UNITED STATES PATENTS

| Number    | Name          | Date          |
|-----------|---------------|---------------|
| 2,318,845 | Feagin et al. | May 11, 1943  |
| 2,335,133 | Renfrew       | Nov. 23, 1943 |
| 2,380,474 | Stewart et al.| July 31, 1945 |
| 2,380,591 | Stewart et al.| July 31, 1945 |
| 2,380,618 | Stewart et al.| July 31, 1945 |
| 2,380,710 | Stewart et al.| July 31, 1945 |
| 2,452,669 | Levine        | Nov. 2, 1948  |

FOREIGN PATENTS

| Number  | Country | Date          |
|---------|---------|---------------|
| 883,679 | France  | Mar. 29, 1943 |

OTHER REFERENCES

Salisbury: "Application of Methyl Methacrylate to the Tooth," article in "Dental Digest," vol. 49, pages 14–17 (January 1943).

Tylman et al.: "Acrylics and Other Synthetic Resin Used in Dentistry," page 84, published by Lippincott, Philadelphia, Pa. (1946).